United States Patent [19]

Grunza et al.

[11] 4,107,460

[45] Aug. 15, 1978

[54] APPARATUS FOR RECOGNIZING WORDS FROM AMONG CONTINUOUS SPEECH

[75] Inventors: Gene Grunza, Blackwood; Marvin B. Herscher, Cherry Hill, both of N.J.

[73] Assignee: Threshold Technology, Inc., Delran, N.J.

[21] Appl. No.: 747,827

[22] Filed: Dec. 6, 1976

[51] Int. Cl.² ............................................. G10L 1/00
[52] U.S. Cl. ............................................. 179/1 SD
[58] Field of Search ................. 179/1 SA, 1 SB, 1 SD

[56] References Cited

U.S. PATENT DOCUMENTS

| | | | |
|---|---|---|---|
| 3,592,969 | 7/1971 | Yoshino | 179/1 SD |
| 3,883,850 | 5/1975 | Martin | 179/1 SA |
| 3,943,295 | 3/1976 | Martin | 179/1 SA |
| 3,946,157 | 3/1976 | Dreyfus | 179/1 SA |

*Primary Examiner*—Thomas W. Brown
*Assistant Examiner*—E. S. Kemeny
*Attorney, Agent, or Firm*—Martin Novack

[57] ABSTRACT

An apparatus for recognizing the occurrence of a command word within continuous speech, features an improved sequential processing of feature signals derived from the input speech: feature subsets are compared with previously stored subset signals to determine the time interval or boundary of command word candidates. The occurrence decision and indication of the command word is made from a comparison of a feature signal matrix versus a previously stored training matrix.

24 Claims, 10 Drawing Figures

APPARATUS FOR RECOGNIZING WORDS FROM AMONG CONTINUOUS SPEECH

The invention described herein was made in the course of or under a contract or subcontract thereunder, with the Department of the Air Force.

BACKGROUND OF THE INVENTION

This invention relates to speech recognition apparatus and, more particularly to an apparatus for recognizing the occurrence of a specific word or words from among continuous speech.

There have been previously developed various equipments that attempt to recognize limited vocabularies of spoken words by analysis of acoustic events. Typically, such equipments are envisioned as being useful in "voice command" applications wherein, upon recognizing particular words, the equipment produces electrical signals which control the operation of a companion system. For example, a voice command could be used to control a conveyor belt to move in a specified manner or may control a computer to perform specified calculations.

Previous efforts to develop automatic methods of speech recognition have had limited success and have led to the realization of the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred past schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

For various reasons, most prior art systems have been found unsuitable for practical applications. One of the prime reasons has been the sheer complexity of equipments that attempted to make an overly rigorous analysis of received speech signals. In addition to the expense and appurtenant unreliability, such systems have a tendency to establish highly complicated and restrictive recognition criteria that may reject normal variations of the system vocabulary words. Conversely, some equipments suffer from establishing recognition criteria that are too easily met and result in the improper acceptance of extraneous words not included in the preselected vocabulary of the equipment.

In the copending application Ser. No. 531,543, filed Dec. 11, 1974, and assigned to the same assignee as the present application, there is disclosed an apparatus which receives spoken input "training" words and a subsequent spoken input "command" word and generates a correlation function that is indicative of the resemblance of the command word to each training word. A feature extraction means processes received input words and generates digital feature output signals on particular ones of a number of feature output lines, the particular ones depending on the characteristic features of the word being spoken. The status of the feature signals which occur during each training word are stored as a normalized time dependent matrix. Subsequently, the status of the feature signals which occur during a command word are also stored as a normalized time dependent matrix. The command word matrix is then compared, member by member, with each training word matrix and a correlation figure is generated for each comparison. If a sufficiently high correlation is found between the command word matrix and a particular training word matrix, the command word is deemed to correspond to the particular training word. This type of system has been found to operate most satisfactorily in applications where command words are spoken in "isolation"; i.e., where there are discernable pauses between words, the pauses defining the word boundaries. Generally, circuitry is provided which senses the onset of speech after a pause and which then senses the next substantial absence of speech. These occurrences are considered the boundaries of a word and the feature events which occur between these boundaries are used to form the matrix referred to above. Clearly, any system wherein distinct pauses are required to determine word boundaries will necessarily have severely limited capability for recognizing words from among natural continuous speech since there is often little or no discernable pauses between words in natural speech.

In the U.S. Pat. No. 3,883,850 assigned to the same assignee as the present application, there is described a type of system that has been employed in the past with some success to recognize the occurrence of words during continuous or connected speech. The technique utilized is a sequential analysis of phonetic events. A sequential logic "chain" is provided for each word to be recognized. Each chain includes a number of logic stages, one stage being provided for each phonetic event of the word to be recognized. The logic stages are configured in a series arrangement and selectively enabled in such a manner that they are sequentially activated when a particular sequence of phonetic events (or features) occurs. As a simplified example, the word "red" can be expressed by the phonetic sequence /r/→/ε/→/d/. Accordingly, a logic chain employed to recognize the word red would have three logic stages coupled in series, the first stage being enabled by the sensing of an /r/ sound, the second stage being enabled by the sensing of an /ε/ sound and the third stage being enabled by the sensing of a /d/ sound. Of course, the second and third stages would each also require the prior stage to have been enabled as a precondition. When the last stage is enabled, the system indicates that the word red has been spoken since the phonemes /r/, /ε/, and /d/ are known to have occurred in the listed order. As explained in abovereferenced application, the system typically requires that the phonemes occur within certain time constraints and provides for a logic chain to be "reset" (i.e., start over from scratch in looking for its vocabulary word) upon occurrence of certain acoustic features which would indicate a strong improbability that the sought vocabulary word is being uttered.

It will be appreciated that the sequential logic type of system as described has a capability of recognizing vocabulary words among continuous speech, even when there is no discernable pause before or after the word is spoken. This is because the system is designed to sense the occurrence of a particular sequence of phonemes and no word boundaries need occur to isolate the word so an analysis can be made. Notwithstanding this advantage, it has been found that the described type of sequential logic system has some recognition deficiencies that could use improvement. As alluded to above in general terms, speech recognition systems sometimes establish an overly restrictive recognition criteria, and this is often the case with the sequential logic type of system. Specifically, if the sequential logic system requires a certain restrictive sequence of phonemes for recognition, the absence of even a single phoneme from the prescribed sequence will prevent a recognition indication. In many cases such restriction causes a sought word to go unrecognized since contextual effects can easily cause even the same speaker to extraneously insert or omit a phoneme (or, more precisely, a phonetic feature) when uttering the same word on different occasions. This type of error lowers the system's recognition rate. The recognition rate can obviously be raised by relaxing the recognition criteria and allowing various alternative sequences to trigger recognition indications. However, such relaxation is found to increase the occurrence of "false alarms"; i.e. false triggerings of recognition indications by words (or phonetic sequences in adjacent words) that are similar to a word being sought.

In the U.S. Pat. No. 3,943,295 assigned to the same assignee as the present invention, there is disclosed a speech recognition apparatus which is capable of recognizing words from among continuous speech and which exhibits a relatively high recognition rate and a relatively low false alarm rate. In that invention, means are provided for generating feature signals which depend on the features of an input word being spoken. The feature signals are processed to determine the time interval of occurrence of a predetermined sequence of features. Further means are provided for comparing the feature signals which occur during the determined time interval with a stored set of features that are expected to occur characteristically during the command word to determine the degree of correlation therebetween. In other words, a sequential type of analysis is performed initially to determine the boundaries of a command word during continuous speech and, once determined, the speech features which occur between the boundaries are correlated as against a stored set of features. The present invention is of the general type set forth in the U.S. Pat. No. 3,943,295, but is an improvement thereon. In a disclosed embodiment in the patent, the sequential processing of feature signals is performed using a sequential logic chain having a plurality of sequential logic units which are sequentially activated when signals appear on logic input terminals of the sequential logic units. The present invention includes, inter alia, an improved version of the sequential processing technique of the described system.

It is an object of the present invention to provide a speech recognition apparatus which is capable of recognizing words from among continuous speech and which exhibits a relatively high recognition rate and a relatively low false alarm rate.

SUMMARY OF THE INVENTION

The present invention is directed to an apparatus for recognizing the occurrence of a command word from among input speech that may be of continuous form. In accordance with the invention, means are provided for generating successive subsets of feature signals which depend upon the presence, during successive individual time slots, of features in the input speech. Means are provided for sequentially processing the generated feature signals to determine the time interval of occurrence of a command word candidate. This, generally, is the technique utilized in the above-referenced U.S. Pat. No. 3,943,295. In the present invention, however, a novel type of sequential processing means is utilized. In particular, the sequential processing means includes means for comparing the generated subsets of feature signals with a predetermined sequence of previously stored subsets of features to determine when a predetermined comparison standard is met over a particular time interval. This time interval is determinative of the boundaries of the command word candidate. Additional means are provided for effecting a further comparison as between a matrix formed from the feature subset signals which occurred during the particular time interval with a previously stored matrix of features that are expected to occur characteristically during the command word. An occurrence indication is generated when this further comparison meets another predetermined standard. The occurrence indication is typically utilized to control a companion system.

An advantage of the present invention is the flexibility of the sequential processing as compared to a system which employs a "chain" of sequential logic units, typically hard-wired. The recognition rate of command word "candidates" is accordingly enhanced. Also, stored feature subsets can be obtained by a "training" procedure and stored in an erasable memory.

In a preferred embodiment of the invention the sequential processing means is operative to compare a generated subset of features with a particular previously stored subset of features only after prior generated subsets of feature signals have already met predetermined individual comparison standards when they were compared to other previously stored subsets of features. The stored subsets of features are typically determined from feature signals found to occur during "training" utterances of the command word. The stored subsets of features are arranged in a sequential priority order which depends upon the order in which they were found to occur during the training utterances of the command word. Also, in the preferred embodiment of the invention the means for sequentially processing the generated subsets of feature signals includes means for generating a plurality of provisional time intervals; i.e. "provisional boundaries". The means for comparing matrices is then adapted to perform the matrix comparison for each of the provisional boundaries.

Further features and advantages of the invention will become more readily apparent from the following detailed description when taken in conjunction with the accompanying drawings.

DESCRIPTION OF THE PREFERRED EMBODIMENTS

Figure 1:
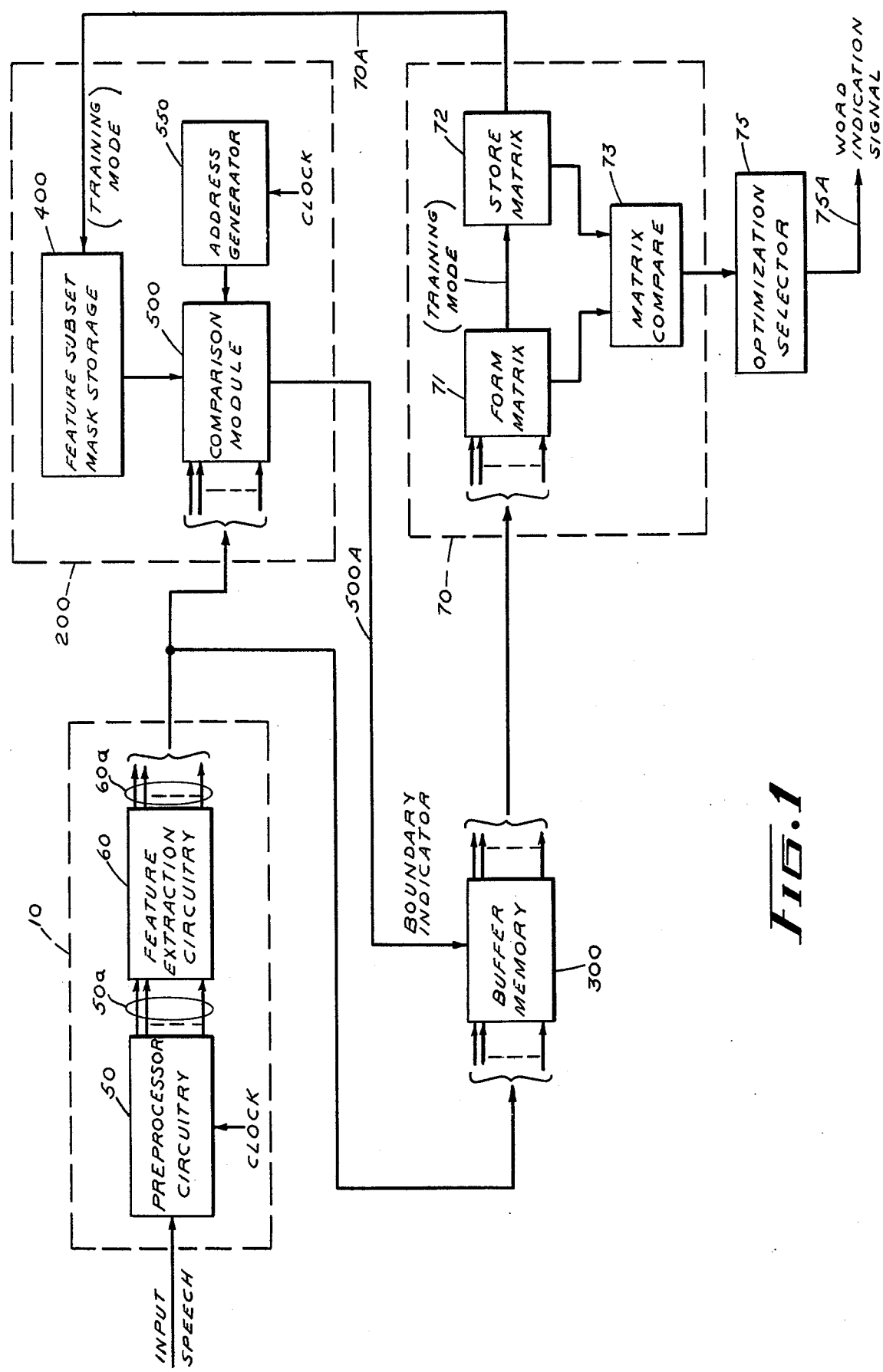
FIG. 1 is a block diagram of an apparatus in accordance with an embodiment of the invention.

Referring to FIG. 1, there is shown a simplified functional block diagram of an apparatus in accordance with the invention. Input spoken words are received by a feature extraction means 10 which comprises preprocessor circuitry 50 and feature extraction circuitry 60. (As referred to herein, the terms "input spoken words", "spoken words", "speech", or the like are intended to generically include any acoustical or electrical representation of communicative sounds. Typically, the circuitry 50 is adapted to receive word communications directly from an individual, or work representative electrical signals from over a telephone line or tape recorder.) The preprocessor circuitry 50 utilizes a bank of bandpass filters to translate speech into a plurality of spectral component signals on lines 50a. The signals on lines 50a are received by the feature extraction circuitry 60 which generates feature output signals on particular ones of a number of feature output lines 60a, the particular ones depending on the features contained in the speech being received. Signals on the feature output lines may represent, for example, the presence commonly used vowel or consonant sounds. As will be further described, the circuitry 50 and 60 may be of a type that is known in the prior art.

The feature output lines 60a are coupled to sequential processing means 200 (shown within the dashed enclosure) and also to a buffer memory 300 whose output is coupled to processing circuitry, the functions of which are generally shown within the dashed enclosure 70. For clarity of understanding, the sequential processing means 200 is shown as including a block 400 for storing feature subset masks, a comparison module 500, and an address generator 550. As will be described in detail hereinbelow, the functions of the sequential processing means 200, along with the buffer memory 300, circuitry 70 and block 75, are preferably implemented using a general purpose digital computer, such as the Data General Corp. series Nova 1200. It will be understood, however, that the functions illustrated by these blocks can alternatively be implemented, for example, using a special purpose computer, microprocessor, or hard wired circuitry, etc.

To best understand the functioning of the sequential processing means 200, it is helpful to visualize the block 400 as storing a plurality of feature subset masks which are utilized to establish a "standard" against which incoming subsets of features (on the lines 60a) are continuously and successively compared, by comparison module 500. During a "training" mode, the feature subset masks are formed in a manner to be described. During the operational mode, feature signals on the lines 60a are coupled to the buffer memory 300 which also receives addresses from an address generator 550. The addresses may be generated by simply counting the system's basic clock, and the addresses are used to keep track of the time of occurrence of each incoming subset of features (on the lines 60a) which occur during a given time slot. As each incoming feature subset is output on the lines 60a (this occurring once each time slot or sample interval; i.e., once every two milliseconds in the present embodiment), it is stored in the buffer memory 300 at an address which identifies its time slot, and it is also coupled to the comparison module 500 for comparison with the appropriate one (or ones) of the stored feature subset masks. After a successful sequence of "matches" between incoming feature subsets and store feature subset masks have been observed, the comparison module 500 is considered as having identified a command word "candidate", and the boundaries of the candidate are utilized (as represented functionally by the line 500A in FIG. 1) to determine which overall time interval in the buffer memory is to be further processed by the circuitry 70. As will become understood, the comparison actually yields relatively coarse boundary extremes and a plurality of different or "provisional" boundaries are tried during subsequent processing by the circuitry 70.

Under control of boundaries determined by the sequential processing means 200, the buffer memory 300 loads the previously stored feature signals (which had appeared on lines 60a) into processing circuitry, the functions of which are generally shown within the dashed enclosure 70. Briefly, operation of the circuitry 70 is as follows: A time dependent matrix is formed from the feature signals received from the buffer memory 300, this function being represented by the block 71. As noted, the matrix members represent the status of feature signals that occurred during the command word "candidate". During the training phase, another matrix had been stored in processing circuitry 70, as represented by the block 72. This other matrix has members which represent the status of feature signals that are expected to occur characteristically during the command word. The two matrices are compared, this function being represented by the block 73. The comparison is preferably performed on a member-by-member basis and results in a determination of the degree of correlation between the two matrices. In the preferred embodiment of the invention, the matrix is formed (block 71) for each of provisional boundaries. The matrix comparison (block 73) is performed for each resultant matrix. The optimization selector 75 represents the function of selecting the comparison which yields the highest correlation score. If the highest correlation score is above a predetermined threshold, it is deemed that the command word has been spoken, and the signal is generated on a line 75A, this signal typically being utilized to control a companion system. It is again noted that the blocks shown in the dashed enclosures 200 and 70 indicate functionality and are set forth for ease of explanation, the present implementation employing a general purpose digital computer to perform these functions, as well as the function of buffer memory 300. It should also be noted again that these functions could, if desired, be performed by a suitably designed special purpose computer, microprocessors, and/or hard wired circuitry including suitable memory and logic circuitry.

FIG. 2 illustrates, in some further detail, prior art feature extraction means which is of a type that is suitable for use as the feature extraction means 10 of FIG. 1. A full description of both the proprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Mich. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus thought inventive.

Figure 2A:
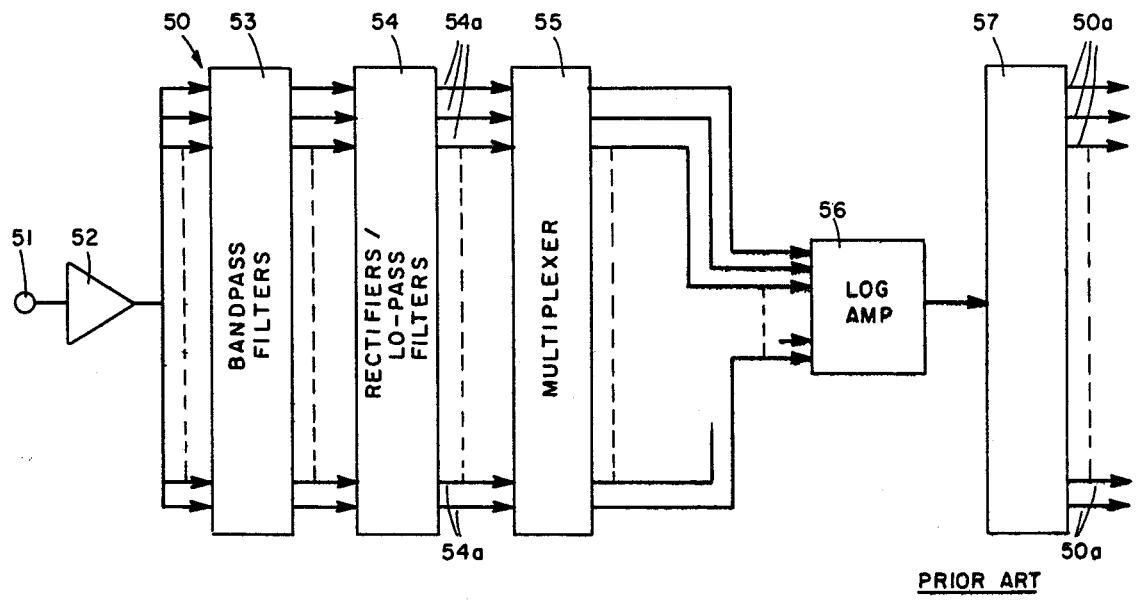
FIGS. 2A and 2B are block diagrams of prior art circuitry useful as the feature extraction portion of the invention.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to nineteen contiguous bandpass filters in a filter bank 53. Each filter in the bank produces an output signal related to that portion of the input signal which lies in the range of frequencies passed by the particular filter. Typically, the filter center frequencies range from about 250 to about 7500 Hz with the lowest filter bandwidth being about 150 Hz.

The output of each filter in the bank 53 is individually coupled to a full wave rectifier and lowpass filter combination located in a rectifier/lowpass filter bank 54. After rectification and filtering, the outputs of the bank 54 essentially represent the energy levels of the input signal at about the center frequencies of each of the bandpass filters in the bank 53. Viewed in another way, the signals on lines 54a collectively represent the envelope of the energy vs. frequency spectrum of the received input signal taken over the frequency range of interest.

The nineteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input speech of varying loudness is to be recognized.

In the diagram of FIG. 2A, a single log amplifier 56 is time shared to avoid the necessity of using nineteen identical amplifiers to achieve compression. The outputs on 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above one KHz and is safely higher than is necessary to retain signal bandwidths. This technique of sharing a single logarithmic amplifier is known in the art and is disclosed, for example, in U.S. Pat. No. 3,588,363 of M. Herscher and T. Martin entitled "Word Recognition System for Voice Controller" as well as in the above-referenced publication of T. Martin.

It will be recalled that the spectral component signals on lines 50a are entered into the feature extraction circuitry 60 (FIG. 1) which senses the presence of properties of the spectral component signals that correspond to preselected properties or "features" of input words. In the prior art feature extraction circuitry being described for illustration, this sensing of properties or "feature extraction" is achieved in part by deriving quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

Figure 2B:
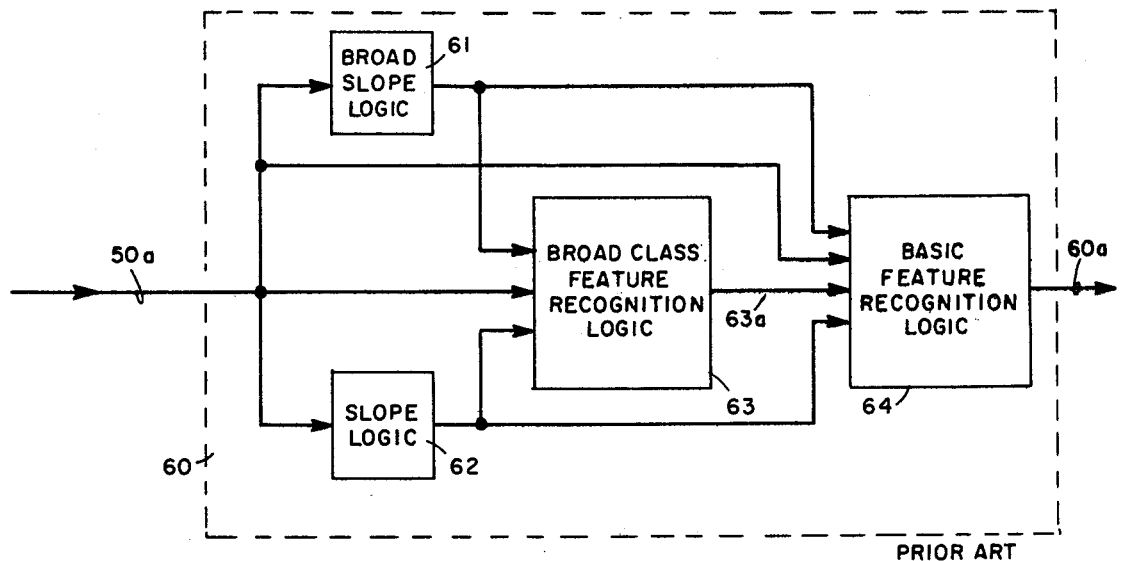

FIG. 2B shows a block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel like", "voicing only", "burst", "voiced noise-like consonant", etc. The signals 63a as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, /ʃ/) of the input spoken words. The block 64 will typically also include an intermediate block that derives "common group features" (e.g. "front vowel", "back vowel", "fricative", "stop consonant", etc.) and such common group features can be the most specific features derived for further processing by the system of FIG. 1. However, narrowly defined phonetic feature signals facilitate explanation of subsequent circuitry, so the feature signals 60a will therefore be assumed to be of this form for portions of the description. It should be emphasized, however, that the invention to be described is not limited to any particular form of feature signal generation.

Figure 4:
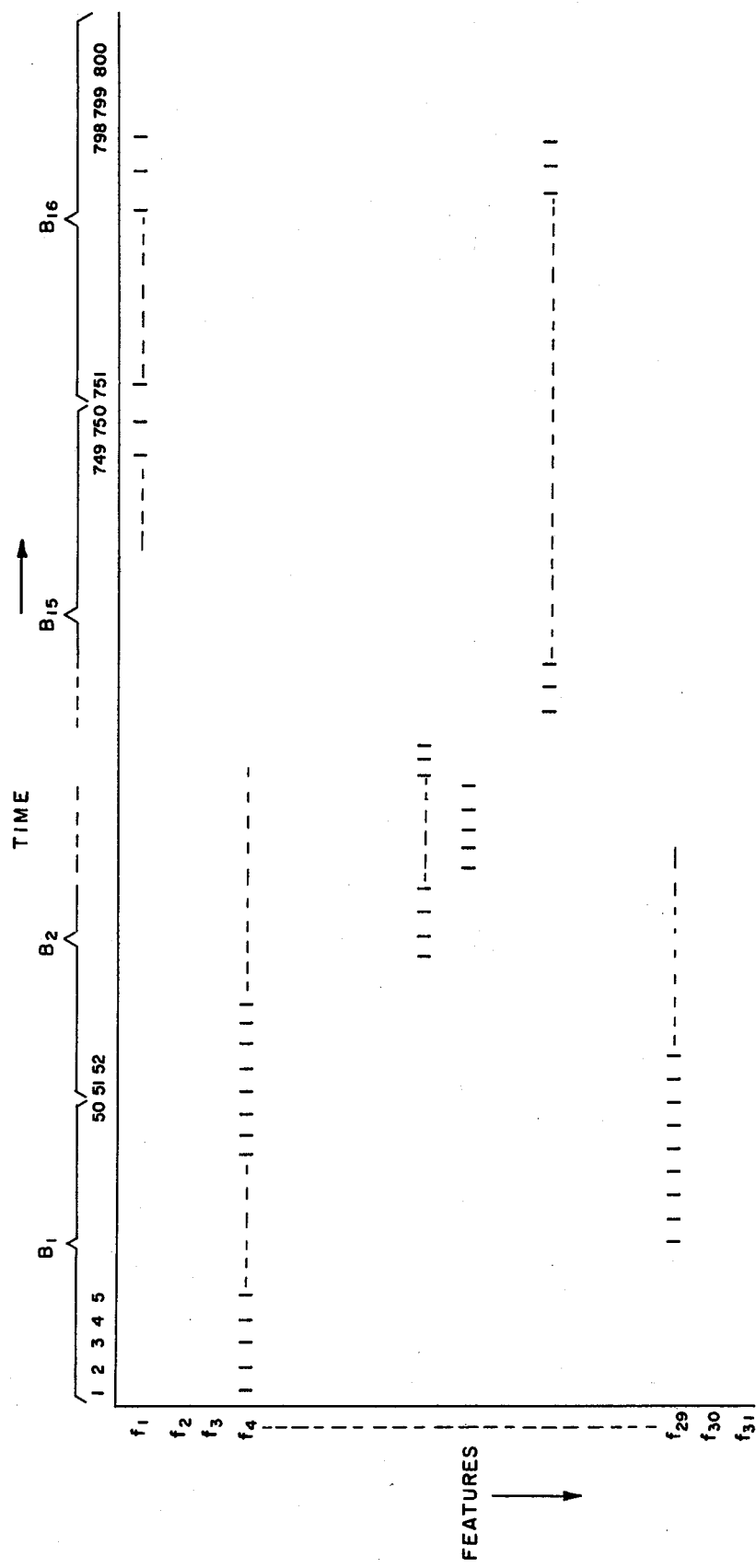
FIG. 4 helps illustrate the type of matrix that results from the storing of the status of binary features by the processing circuitry of FIG. 1.
Figure 5:
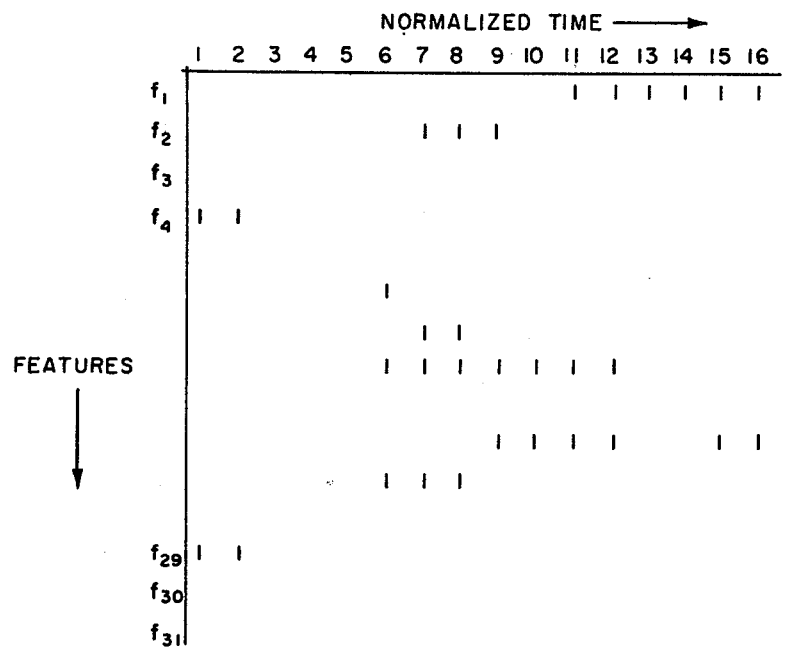
FIG. 5 helps illustrate a time normalized matrix.

FIG. 4 illustrates the operation of processing circuitry 70 by showing the type of matrix that results from storing the status of the binary features which occurred during the command word candidate. In the present embodiment thirty one binary feature signals, hereinafter sometimes designated $f_1$ through $f_{31}$, are derived on thirty one feature output lines 60a and continuously indicate the presence or absence of specific features. In the example of FIG. 4 it is assumed, for purposes of illustration, that the input word had a time duration of 1.6 seconds. This means that the resultant matrix has dimensions of 31 × 800. In other words, it records the presence or absence of each of 31 features over 800 sampled "time slots", each time slot being 2 milliseconds long. As is seen from the representative 1's of the FIGURE (inserted arbitrarily for illustration), different features occur for varying portions of the word duration with a particular feature usually being "on" continuously for a number of milliseconds. The absence of a 1 in a matrix position implies a 0; i.e., the absence of the feature. The time normalization function, performed by circuitry 70, reduces each input word matrix to a 31 × 16 matrix, the time axis being reduced down to 16 normalized time slots. The normalization can be performed in a number of ways, one technique involving the selection of the normalized time periods which include a majority of 1's. The arithmetic process for carrying out this technique is quite straightforward, basically involving simple division and counting. To illustrate, in the example of FIG. 4 the 800 time slots for each feature would be divided into groups of 50 as shown by the brackets labeled $B_1$ through $B_{16}$. Each bracket contains 50 time slots so, in this example, a particular normalized time slot for a feature will be assigned a 1 if the bracket contains at least 26 1's. In FIG. 4, the feature $f_1$ has a majority of 1's in the time included in bracket $B_{16}$. Therefore, the 16th and last normalized time slot for $f_1$ will contain a 1. An entire 31 × 16 normalized matrix is formed in this manner by examining the count of ones under each of 16 brackets for each of the 31 features. In the example given, the overall time is an exact multiple of 16, but if this is not the case, any remainder is distributed among the brackets in a specified manner. For example, if there has been originally 803 time slots (1606 milliseconds), then each of the first three brackets would have included 51 time slots rather than 50, the remainder of the brackets including 50 time slots. FIG. 5 illustrates a typical normalized matrix for a command word candidate with the 1's again being shown and 0's being implied by the absence of a 1 at a matrix position.

A detailed description of the operation of suitable processing circuitry 70, in the form of a properly programmed general purpose computer, is set forth in the above-referenced copending application Ser. No. 531,543. As indicated, a time normalized matrix is formed for the command word candidate. Before commencing operation, another time normalized matrix of this same type had been stored in the computer, as represented by the block 72. This previously stored matrix has members which represent the status of feature signals that are expected to occur characteristically during the command word and can be formed, for example, during a "training" period, as set forth in the referenced copending application. The two matrices are then compared to determine the degree of correlation therebetween, as discussed above and, again, as described in detail in the referenced copending application. It should be emphasized, however, that the present invention is applicable to any processing circuitry 70 which can compare the feature signals occurred occurrred during the specified interval with a stored set of expected features, so the invention is not limited to any particular processing circuitry 70.

Before describing the details of operation of the sequential processing means 200, some of the operating principles will be described to facilitate understanding. As noted above, during each new time slot, a subset of feature signals is generated; i.e., a subset of thirty one binary features which identify the speech characteristics of the input speech during the particular time slot in question. (A subset would be, for example, the thirty one features indicated by one column of the matrix of FIG. 4, although it should be remembered for the time being that the matrix of FIG. 4 relates to the processing circuitry 70 wherein the boundaries of an entire word candidate have been defined, whereas in the present portion of the description of processing means 200 each feature subset stands alone and is individually considered.) Applicant has discovered that the individual feature subsets can be advantageously sequentially processed by effecting a comparison thereof with previously stored feature subsets that are known to occur characteristically in a common word to be detected. The processing performed by the circuitry 200 of FIG. 1 is sequential in nature, i.e. matching of instantaneously received feature subsets with previously stored feature subsets (called "masks") takes into account the degree to which prior matching was already found to occur. In the present embodiment, the command word (the present description pertaining to recognition of a single command word for ease of illustration) has M previously stored feature subset masks associated with it, M being eight for this embodiment. These previously stored feature subset masks represent the feature subsets that are expected to occur characteristically during different stages of the command word. For example, assume that the stored feature subset masks for the command word are denoted MASK 1, MASK 2 . . . MASK 8. The MASK 1 represents a feature subject which is expected to occur characteristically near the beginning of the command word, the MASK 8 represents a feature subset expected to occur characteristically near the end of the command word, and the masks MASK 2 through MASK 7 represent feature subsets expected to occur, in order, during the body of the command word. Incoming speech is identified as a command word "candidate" if a sequence of feature subsets sufficiently matches (i.e. correlates) with the stored feature subset masks. The matching is sequential in nature; viz., the search for a match with MASK 2 does not commence until MASK 1 has been sufficiently matched, the search for MASK 3 does not commence until MASK 2 has been sufficiently matched, etc. As will be described further hereinbelow, timing constraints are imposed on the matching criteria. Also, applicant has discovered that it is advantageous to continuously monitor matching of the earlier feature masks, even when in the latter stages of a matching sequence, such that several sequences can be at different states of completion at any given time. For example, assume that requirements for matching masks MASK 1, MASK 2 and MASK 3 have been satisfied and the sequential processing means 200 is currently monitoring for the existence of a feature subset which satisfies MASK 4 (within time constraints to be described). Feature subsets arriving at this point may satisfy the criteria for MASK 1, and the mere fact that a sequence is already in progress (i.e., up to MASK 4) does not negate the possibility that a second, or even third sequence could be "active" at the same time. This is especially true since, it will be recalled, the requirements for the sequential processing means 200 are intentionally made relatively "easy" since it is only desired that this subsystem identify command word "candidates", with the more stringent acceptance criteria being imposed by subsequent processing block 70. It will be understood that many of the sequences will "abort" (due to not meeting time constraints) prior to completion through MASK 8, but provision is made to keep track of plurality of sequences simultaneously, to avoid missing a potentially successful sequence.

In the present embodiment, an eight bit digital "word" is formulated for the feature subset associated with each time slot being processed. Each of the eight bit words is stored at an address which represents a particular time slot, the addresses being generated in sequence by an address generator. Each eight bit word becomes a stored record of which, if any, of the feature masks match with the particular feature subset in question. Thus, for example, if a particular feature subset does not match with any of the feature masks, the eight bit word stored for that particular feature subset (at an address which corresponds to the time slot of the particular feature subset) will be "00000000". As further examples, if a feature subset matches (i.e. sufficiently correlates) with feature MASK 2 only, its eight bit word would be "01000000", or if it matches with both the MASK 1 and the MASK 7 its eight bit word would be "10000010". (The eight bit words are typically stored in computer memory — and this portion of memory may be functionally considered, in FIG. 1, as part of comparison module 500. There is an eight bit word associated with each address or time slot, so each address ends up with two items associated with it; viz., a particular 31 bit feature subset stored in the buffer memory 300 and an eight bit word indicating which of the particular feature subset masks were successfully matched with the feature subset.)

Due to the sequential nature of the processing, each feature subset mask is only tested for a match with the current feature subset if the previous feature mask had yielded a match. (As noted, and will be explained further hereinbelow, this is not the case for the first feature mask which begins the sequence, since there is not previous feature mask and all incoming feature subsets are tested against feature MASK 1.) Time constraints are imposed to insure that an observed sequence of feature subsets occurs with time limitations which approximate the time spacings expected in normal speech. Again, these criteria are intentionally made flexible since a relatively rigorous recognition operation follows the identification of a command word candidate. In the present embodiment, each feature subset mask N (except MASK 1) has a timer associated with it. When a match is found with a stored feature subset mask N, the timer associated with the next feature mask (N + 1) is set to an initial value designated TMAX, this value typically being 200 milliseconds. The value TMAX represents the maximum time during which the next feature subset mask must match with a subsequently arriving feature subset, and if this does not occur the sequence is aborted. Also, when a particular feature subset mask has been successfully matched, a predetermined minimum time must elapse before looking for a match for the next higher feature subset mask (since the stored feature subset masks represent speech portions which are spaced apart in time). This is done by imposing a further time constraint which requires that a predetermined minimum time, designated τ, must elapse from the time that a given timer is set to TMAX before its associated feature subset mask begins to be monitored as against incoming feature subsets. For convenience, we define

TMIN = TMAX − τ.

The timer is initially set to TMAX and is decremented by one every time slot (i.e., every time a new feature subset is processed). Thus, the stated timing constraints require that before a particular feature mask (N + 1) is monitored, the timer associated with it must be less than TMIN, but greater than zero.

Figure 3:
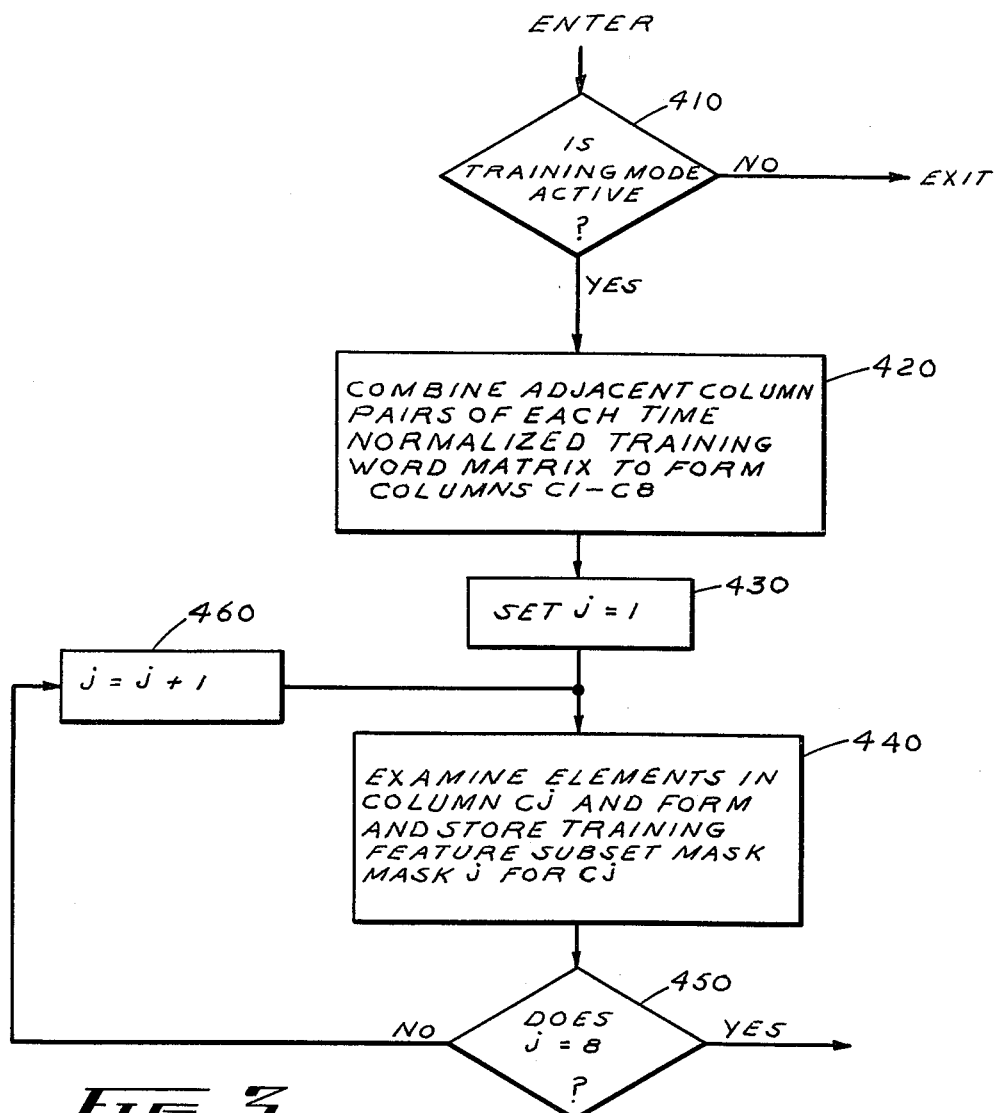
FIG. 3 is a flow diagram suitable for implementing the circuitry 400 to form the feature subset masks which are stored during the training phase.
Figure 6A:
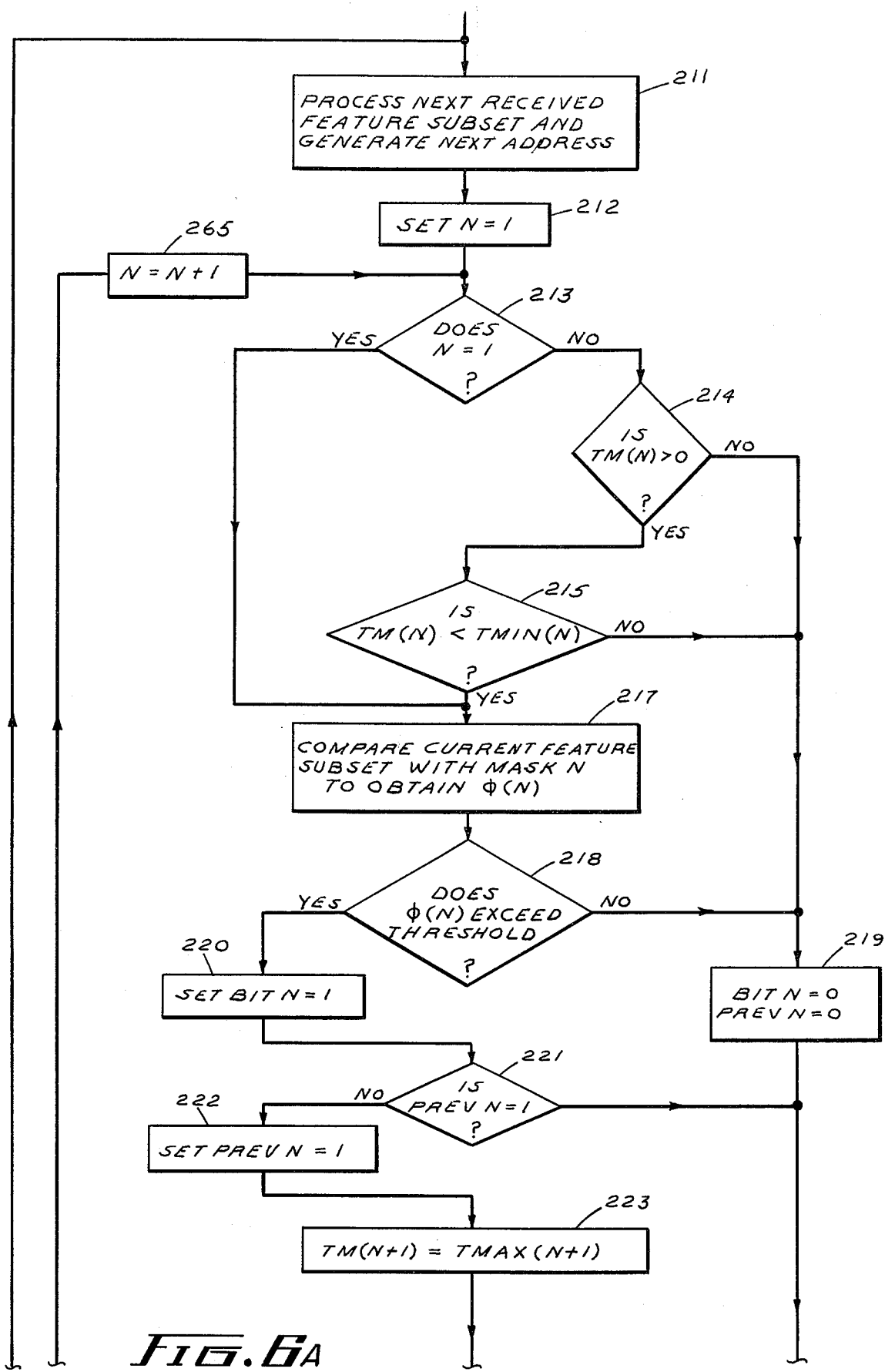
FIG. 6, consisting of FIGS. 6A, 6B and 6C placed one below another, is a flow diagram suitable for implementing a general purpose computer to perform the functions of the comparison module 500 of FIG. 1.
Figure 6B:
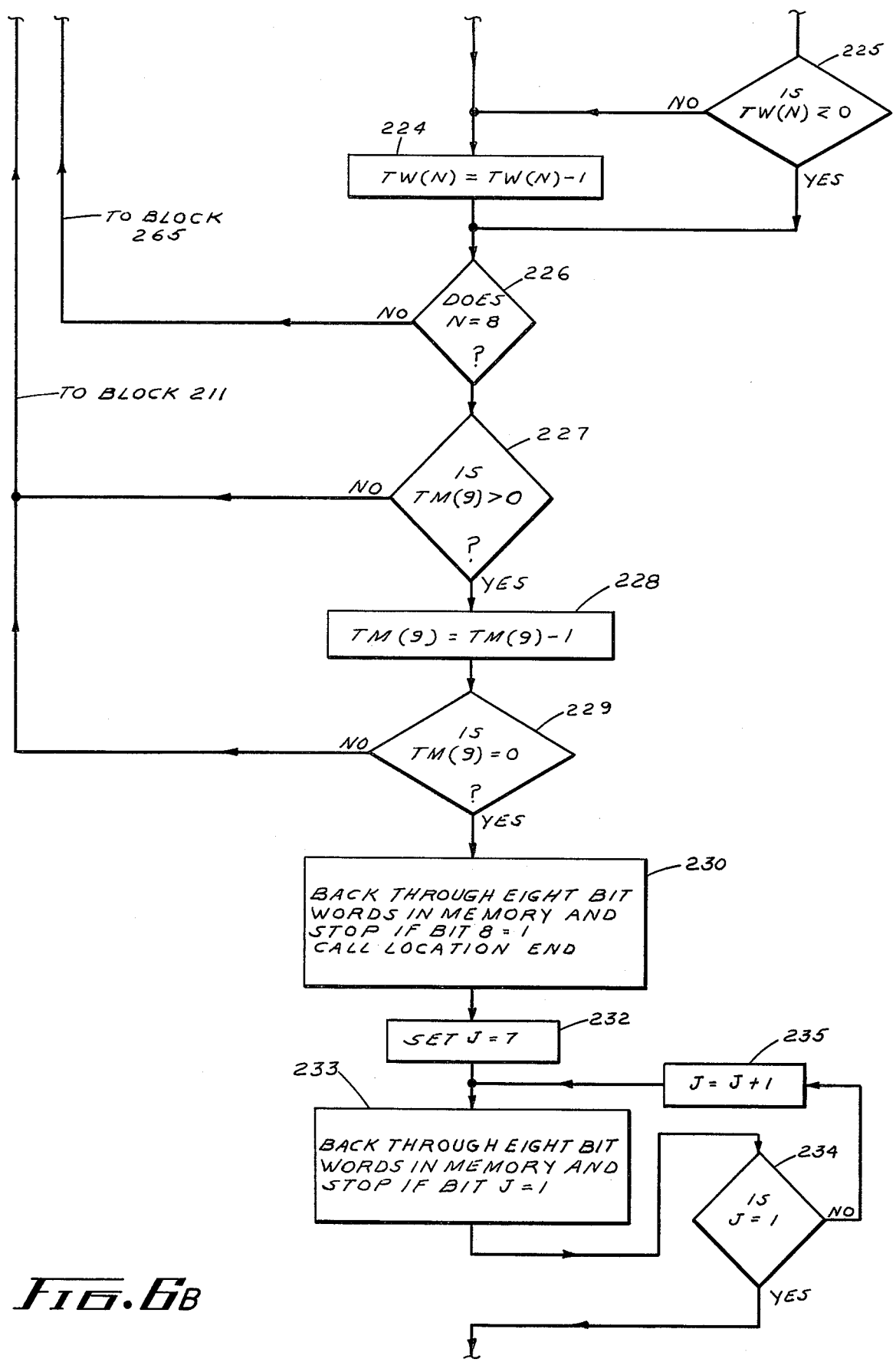
Figure 6C:
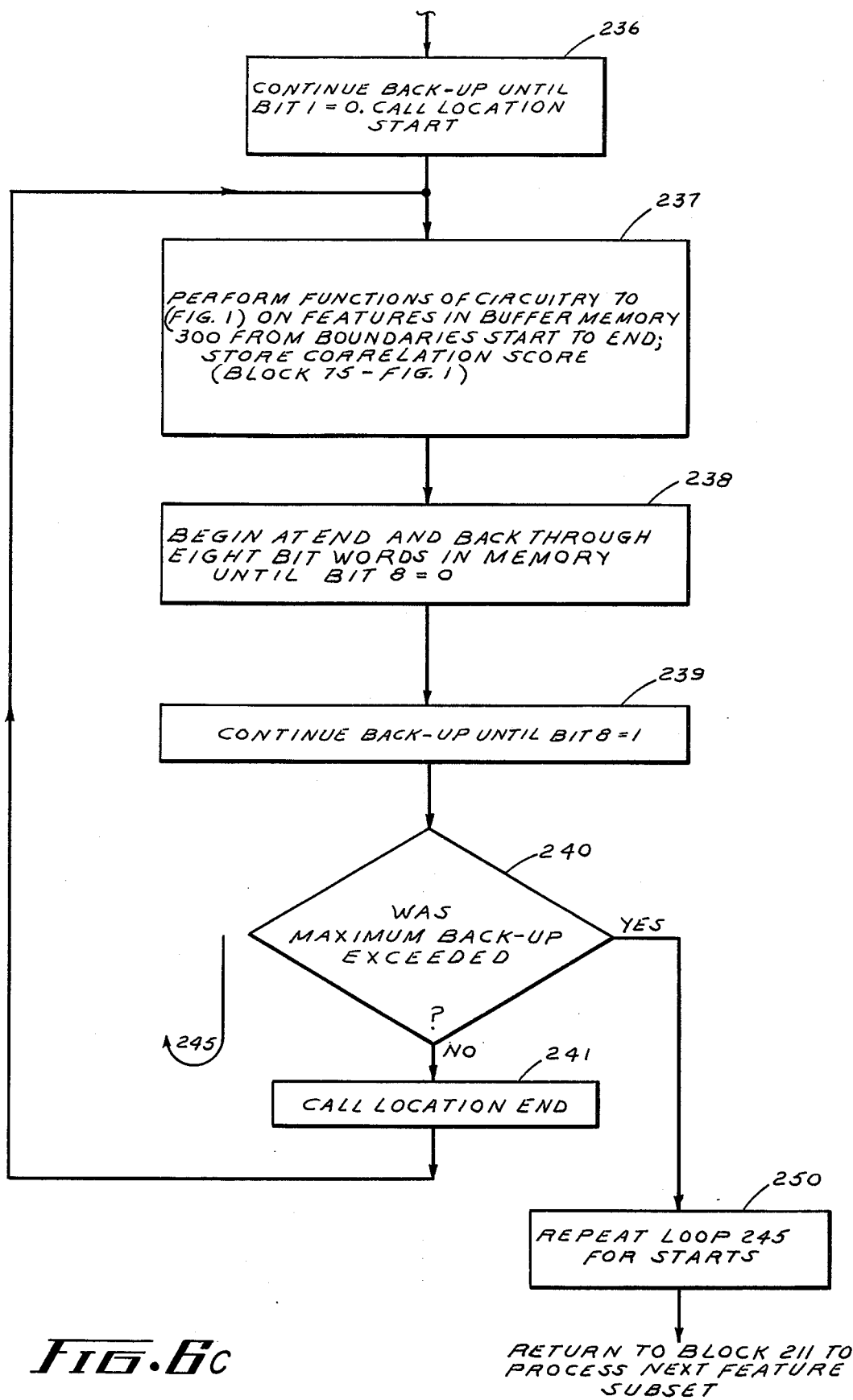

The functions of the sequential processing means depicted within the dashed enclosure 200 can be performed by either suitable "hard wired" circuitry, a special purpose computer, micrologic, or a general purpose digital computer. FIGS. 3 and 6 show flow diagrams for an implementation utilizing a general purpose digital computer, but it will be understood that the listed alternate techniques for implementing these functions could be utilized if desired.

As described above with respect to the processing circuitry shown within dashed enclosure 70, and as described in detail in the above-referenced copending U.S. application Ser. No. 531,543, a "training" phase is utilized prior to operation of the equipment. During this phase, the speaker whose command word is to be later recognized (or command words in the case of a multi-word vocabulary) enunciates the command word a number of times so as to "train" the equipment by allowing storage of a feature matrix representative of features which occur characteristically when the command word is spoken. As described in the above-referenced copending application, multiple training utterances of the same command word are useful in determining consistency in the existence of individual speech features in the matrix. Thus, for example, if ten training utterances are utilized, the system can be adapted to store a "1" (indicative of the presence of a feature) at a position in the ultimately stored matrix only if the feature had occurred at that position in the matrix a given minimum number of times, such as at least five out of ten. In the present invention, in addition to storing a time normalized command word matrix with regard to the functions shown within dashed enclosure 70 (as in the above-referenced copending application), the training phase is also used to formulate the feature subset masks utilized in the sequential processing means 200. The formation and storage of these feature subset masks is represented by the block 400 of FIG. 1. Applicant has found it advantageous to consider, in the stored feature subset masks, only those features which are found to occur consistently during the training phase. In other words, if a feature is found to generally not occur during a given time period (to be described) of the command word, as uttered during the training phase, that feature does not become a part of the stored feature subset mask associated with the particular time period (in the present embodiment, a command word is considered as having eight time periods, and eight corresponding feature subset masks) and is not considered at all when later testing against the feature subset mask. This technique is distinguishable from the previously described technique utilized in conjunction with circuitry 70 wherein the absence of a feature during a particular time slot of training would result in the presence of a zero at the particular row assigned to that feature (e.g. FIG. 4 or FIG. 5) at the time column in question. In the case of the feature subset masks, the feature would be omitted altogether from the mask (rather than have a zero in a particular position), so the stored feature masks typically have substantially less than the thirty one features which appear in each column of the matrices of FIG. 4 or FIG. 5. A further distinction between the feature subset masks and, for examle, the matrix columns of FIG. 4 or FIG. 5, is that the feature subset masks are considered independently, as will become clear.

Referring to FIG. 3, there is shown a flow diagram suitable for implementing the circuitry 400 to form the feature subset masks which are stored during the training phase. A determination is first made as to whether the equipment is in the training mode, as represented by decision diamond 410. If not, the routine is exited. If the training mode is active, a time normalized matrix for the training word, of the type shown in FIG. 5, is formed by the circuitry 70. (See also the block 72 and line 70A of FIG. 1.) The adjacent column pairs of each time normalized matrix for the training word matrix are combined to form eight columns designated C1 through C8 from the original sixteen columns, as represented by the block 420. The rule for combining the two columns is that if there is a "1" in either of the two column positions being combined, the resultant column Cj will contain a 1 — i.e. an indication of the presence of a feature. An index j is set equal to unity (block 430). The elements in the column Cj (Cl for j = 1) are examined to determined which ones contain a "1" and the training feature subset mask, designated MASKj, is formulated for the column Cj of the "compressed" time normalized training word matrix. Thus, for example, if the column Cl has a 37 1" in the row corresponding to features $f_1$, $f_{10}$, $f_{22}$, $F_{25}$, and $f_{31}$, the feature subset mask MASK 1 will have five members at these feature positions. Accordingly, during the subsequent operation phase of the equipment, the feature mask MASK1 will be used by determining whether a give feature subset being tested against it has "1" 's at these five positions and, if so, a match will be indicated. The index j is next tested to determine if it has reached its maximum value of eight (block 450) and, if not, the index is incremented (block 460) and the procedure is repeated for each of the eight columns until all the feature masks have been formed and stored. It will be understood that various alternate techniques can be utilized to form the stored feature subset masks. For example, by studying the phonetic makeup of the command word, one can select those features which are expected to occur consistently, for any speaker, during different parts of the word. However, an advantage of "live" training is that those features which occur consistently, for a particular speaker, are the ones which comprise the resultant stored feature subset masks.

Referring to FIG. 6, there is shown a flow diagram suitable for implementing a general purpose computer, to perform the functions of the comparison module 500 of FIG. 1. During each time slot (two milliseconds in the present embodiment) a new feature subset is output from the feature extraction circuitry (block 60 of FIG. 1) and processing is initiated as represented by block 211. A new address, representative of the present time slot, is generated by address generator 550 (FIG. 1). An index N is initially set to unity, as represented by block 212. N is the index for the stored feature subset masks previously described (as stored in block 400 of FIG. 1). The index N is also used in referencing the timer associated with each of the stored feature masks designated MASK 1 through MASK 8. The index N is tested to see if it is equal to 1 (diamond 213) and, if so, the block 217 is entered. As will become understood, this is a convenient way of insuring that the MASK 1 is always tested against the incoming feature subset. (Unlike the other feature subset masks, which need be tested only when certain preceding conditions have been met, the MASK 1 is tested against each arriving feature subset to detect whether it may be the beginning of a command word candidate.) If N is not equal to one, the timer associated with gate N is tested to see if it is active (diamond 214); i.e., to see whether TM(N) is greater than zero. If so, the gate N timer is then tested to determine whether it is at a value less than the predetermined value, TMIN (N), this function being represented by the decision diamond 215. As noted above, this requirement is imposed to determine whether a specified minimum time has passed since the previous feature mask met the testing requirement. If the condition of diamond 215 is met, the current feature subset being processed is compared with the feature subset mask N, as represented by block 217. The comparison or correlation is performed by examining those particular features of the current feature subset which correspond to the mask features being compared against. For example, and recalling the above-described manner in which the stored feature masks are formed, if a particular feature mask consists of the features $f_2$, $f_7$, $f_{19}$, $f_{21}$, and $f_{30}$, then the current feature subset is examined to determine whether it has logical "1" 's at these feature positions. (In other words, the comparison determines whether these features were present during the particular time slot of the input speech.) The result of this comparison is designated $\phi$ (N) which may be envisioned as a number between zero and one that reflects the degree of correlation. Thus, in the example just given, if the current feature subset did not have a "1" at any of the five indicated feature positions, $\phi$ (N) would be zero, if it had a "1" at all five of the indicated feature positions $\phi$ (N) would be unity, if it had a "1" at three of the five indicated feature positions, $\phi$ (N) would be 0.6, and so on, on a percentage basis. $\phi$ (N) is tested against a predetermined threshold (diamond 218), which may typically be 0.75 or any desired threshold level. If the predetermined threshold is exceeded, bit N is set equal to 1 (block 220). If not, or if the timer requirements tested by diamonds 214 or 215 had not been met, bit N is set equal to zero and an operator designated PREV N is also set equal to zero, as indicated by block 219. It will be recalled that bit N is one bit of the eight bit word previously described. It should be clear that if bit N equals 1, it means that during the particular time slot to which the eight bit word is assigned, a feature subset arrived which both met the conditions for testing against feature subset mask N (diamond 215) and then exceeded the predetermined threshold when compared with feature subset mask N (diamond 218). As will become better understood, the operator PREV N is utilized as a convenient indicator of whether bit N was 1 during the previously processed feature subset.

After bit N has been set to 1 (block 220) PREV N is tested (decision diamond 221) to determine if it is equal to 1; i.e., to determine if bit N had been 1 when the previous feature subset was processed. If not, PREV N is now set equal to 1, as indicated by block 222. (Note that if PREV N already was equal to 1, it remains at 1.) If it is the first time that bit N is set equal to 1, then the timer associated with the next higher feature subset mask (N + 1) is set equal to its maximum value, TMAX (N + 1), as indicated by block 223. (In the prior general description, the preselected timing minimums and maximums, TMIN and TMAX, were assumed to be the same for all clocks. In the embodiment of FIG. 6, these values are expressed as a function of N indicating that, if desired, different timing constraints can be applied for the different feature subset masks.)

The timer associated with feature subset mask N, TM (N), is decremented (block 224). If the timer for N is already zero, as determined by decision diamond 225, the timer is not decremented. The index N is then tested to determine if it is either (the maximum value for this embodiment), this function being represented by diamond 226. If N is not yet eight, it is incremented (block 265) and the diamond 213 is reentered for the next pass (for the particular feature subset being processed). If N is equal to eight, the timer TM(9) is tested to determine whether it is greater than zero (i.e., whether feature subset mask 8 had been matched by a previous feature subset). If not, block 211 is reentered for processing of the next subset. The portion of FIG. 6 below diamond 227, which deals with the situation where feature subset mask 8 has been satisfied, will be described further hereinafter.

It may be helpful to review some aspects of the operation described up to this point. For each incoming feature subset processed, the index N is incremented from one through eight as the eight bit word for the subset's time slot is formed. The timer associated with each value of N is tested (diamonds 214 and 215) to determine whether the feature subset being processed should be compared against the particular feature subset mask N. The timer is basically indicative of two things; viz., (1) whether previous conditions of the sequential processing have been met by successful matching of previous feature masks; and (2) whether timing constraints (since the last feature subset mask was successfully matched) have been met. When these conditions are present, the current subset is correlated with feature subset mask N (block 217) and, if the result exceeds a predetermined threshold (diamond 218) bit N is set equal to one (block 220) and the timer associated with the next feature subset mask is set (block 223). If the result of the correlation does not exceed the predetermined threshold, bit N is set equal to zero (block 219) and the timer associated with the next feature subset mask is not set. In either case, the timer associated with N is decremented (block 224), so after each pass through all eight possible values of N, all active timers have been decremented by one. It can be seen from the foregoing that the timer which is set by the matching of feature subset mask 8, TM(9), will not become active until all eight feature subset masks have been successfully matched in sequence and within the timing constraints set forth. Thus, when TM(9) has a value above zero (diamond 227 positive), it means that the MASK 8 has also been successfully matched during a recent time slot.

Further reference is made to FIG. 6 for a continuation of the description, and especially that portion of the flow diagram dealing with the situation where feature subset mask 8 has been satisfied; i.e., where the presence of a word candidate is indicated. If the answer to the question of decision diamond 228 is "yes" it means that MASK 8 was successfully matched during a previously processed feature subset, so the presence of a word candidate is indicated. For the most part, the remainder of the flow diagram deals with identification of possible ("provisional") starting points and ending points for the word candidate. The block 228 is entered and the timer TM(9) is decremented. Timer TM(9) is then tested (diamond 229) to determine whether it is zero and, if not, block 211 is reentered and the next feature subset is processed. In effect, this allows the routine to continue for a fixed time (after satisfaction of MASK 8) until the timer TM(9) has run out. The stored eight bit words, which provide a complete "history" of when the various feature subset masks were successfully matched, are now utilized. Once timer TM(9) is zero, the stored eight bit words are backed through in reverse order until the last address (time slot) when bit 8 equaled one and this location is called END (block 230). In this manner, the last chronological time at which the feature subset mask 8 was successfully matched is identified as the first provisional end of the word candidate. An index J is set equal to the value of 7 (block 232). The eight bit words are now examined in reverse time sequence to locate the first possible word start; i.e., the location at which bit 1 was first set equal to one. The simple expedient of backing through the eight bit words until an occurrence when bit 1 equaled one is inadequate since it will be recalled that bit 1 may have again assumed a value of one at any time during the processing on a dynamic basis. Instead, the index J is utilized to back through memory and find an occurrence of bit 7 being one, then finding an occurrence of bit 6 being one, etc., until finally an occurrence of bit 1 equals one is found. In this manner, it is assured that the provisional start location is the start of a full sequence. Accordingly, in FIG. 6, after J is set equal to 7, the eight bit words are examined in reverse time until bit J is one (block 233). The index J is then tested to determine if it is one (diamond 234). If not, J is decremented (block 235) and the procedure continues until J equals one. At this point, the back-up continues in memory until the first instance where bit 1 is found to be zero (block 236), and this location is called START.

Figure 7:
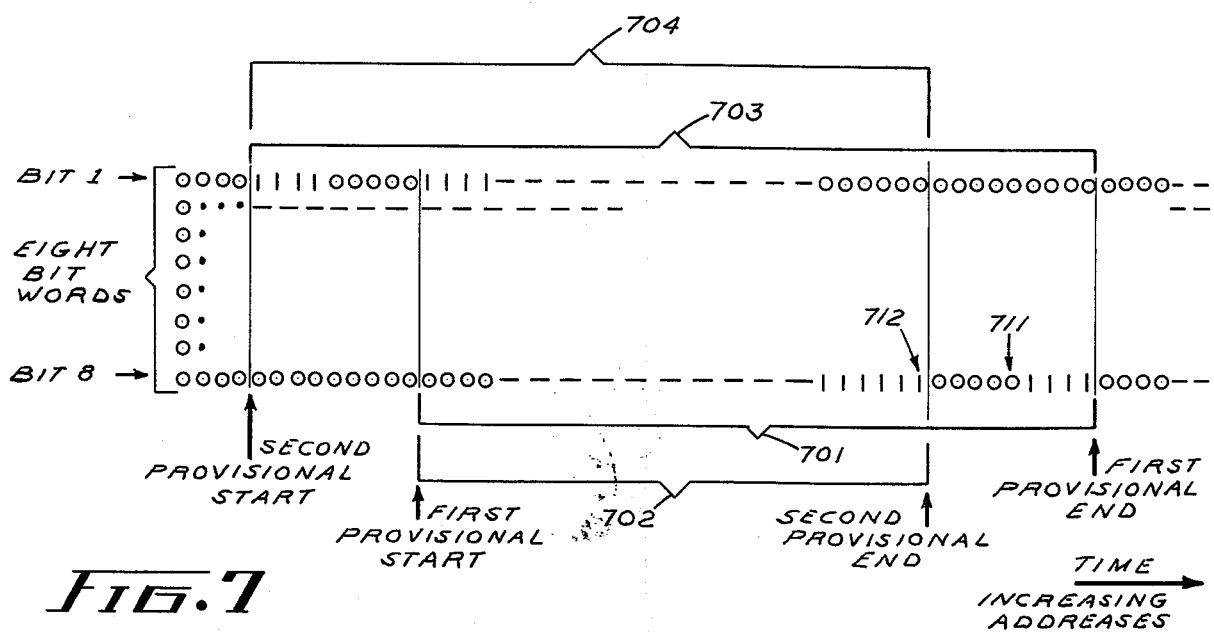
FIG. 7 illustrates a sequence of eight bit words of the type generated in accordance with the invention, and is useful in understanding the invention.

Reference is made momentarily to FIG. 7 which illustrates a sequence of eight bit words as they might occur in time sequence when a command word candidate has been identified. Only bit 1 and bit 8 are shown for most of the eight bit words, for purposes of illustration. Since an eight bit word is stored every time slot, the time axis can be considered as running from left to right in FIG. 7. The bracket 701 illustrates the first set of provisional boundaries which would be obtained using the routine of FIG. 6 as just described. In particular, the location "END" is obtained by backing through the eight bit words in memory until bit 8 is found to equal 1 (block 230 of FIG. 6). In FIG. 7, this location is labeled as the "first provisional END". Subsequently, by operation of the functions represented by blocks 232-236, the START location is obtained, labeled in the FIG. 7 as "first provisional START". The feature subsets which occurred in the time period defined by the bracket 701 are then subjected to the processing represented functionally by circuitry 70 (block 237). A correlation score, which represents the output of dashed enclosure 70, is then stored, as represented by the optimization selector block 75 of FIG. 1. Applicants have found that the end of a word is characterized by transitions from a 1 to a 0 in the last bit, i.e. bit 8 in the present embodiment. However, due to the inexact nature of speech sounds and the flexible feature mask processing employed, bit 8 may have a plurality of transitions from a 1 to a 0 near the end of the command word. It is advantageous to try these different provisional ends as possible command word boundaries, so as to enhance the probability of an optimized correlation by the processing circuitry 70. An example of such a transition is labeled as "second provisional END" in FIG. 7. The bracket 702 illustrates another set of provisional boundaries which define the time interval of feature subsets that are input to the processing circuitry 70 for another comparison or correlation with the stored command word matrix. A number of such transitions can also occur at the beginning of the word, as is indicated by the label "second provisional START" in FIG. 7. The brackets 703 and 704 show that the second provisional START can be used as a boundary in conjunction with both of the provisional END boundaries so that, in the example of FIG. 7, four provisional boundaries are employed in matching a command word candidate against a previously stored command word matrix of circuitry 70. It is seen that the total number of provisional boundary sets is equal to the product of the provisional STARTS times the provisional ENDS.

Referring again to FIG. 6, after the correlation score for the original boundary set has been stored (block 237) block 238 is entered and, beginning at the previously established END, backing up is effected until bit 8 is again 0. In the example of FIG. 7, this would correspond to the time slot whose bit 8 is indicated by arrow 711. Block 239 is then entered and back-up is continued until bit 8 is again 1, e.g. at the time in FIG. 7 indicated by arrow 712. This location is now designated as "END", as represented by the block 241. However, prior to designating the particular time slot as the next provisional "END", decision diamond 240 determines whether the amount of back-up exceeded predetermined maximum back-up. This is done so that the back-ups of blocks 238 and 239 are not unlimited, as may be the case when the last recent 1 to 0 transition of bit 8 has been encountered.

Having established a new location "END", block 237 is reentered and the processing represented by circuitry 70 is performed on the features defined by the present boundaries START to END. In the example of FIG. 7, this would correspond to the features which occurred during the time slots having the eight bit words within the bracket 702. The loop designated 245 continues in this manner with the original START being tried with all provisional ENDS, and each time a correlation score is stored (block 75 of FIG. 1). When the preestablished maximum back-up is exceeded, the block 250 is entered. This block represents the same processing as was performed by the loop 245, but with respect to the START boundary (0 to 1 transitions being searched out); viz., each START is tried with all ENDS. This having been done, the highest correlation score is examined to determine whether it exceeds a predetermined standard. If so, a word indication signal is issued (line 75A of FIG. 1), this signal typically being utilized to control a companion system. If the highest correlation score does not exceed the predetermined standard, no word indication signal is issued. In either event, processing of incoming feature subsets by the circuitry 200 continues.

The invention has been described with reference to a particular embodiment, but variations within the spirit and scope of the invention will occur to those skilled in the art. For example, the invention was described, for ease of illustration, in terms of recognizing a single command word from among continuous speech. However, it will be recognized that a plurality of command words can be recognized by providing appropriate stored feature subsets and stored matrices for the different command words of a desired vocabulary, and by performing the described operations in each case. Further, it will be understood that the particular application of the equipment (e.g., the nature of the companion system to be controlled) will dictate the necessary response time to the voice command, and feature subset data can be buffered to an appropriate degree. Thus additional processing time can be made available when the circuitry or computer employed is not fast enough to provide virtually instantaneous recognition signal response. It will also be understood that the number of provisional STARTS and ENDS can be limited in alternate ways, such as by providing counters to keep track of the number of provisional boundaries attempted for each work candidate, causing a cutoff above a prescribed level. A further possible variation of the system as described utilizes a "running average" of features received over a plurality of time slots for comparison against the stored feature subset masks. For example, each feature subset compared with the stored masks could be the average of, say, features which occurred during the previous $r$ time slots, so that each feature subset used for comparison purposes would contain new data as well as some previously occurring data. The number $r$ of time slots to be averaged can be made dependent upon observations during the training phase. In one form of this variation, averaging of incoming features can be utilized as an expedient to store data which occurred while processing is being performed. In such instance the average interval to be used for comparison purposes would vary as a function of processing time. In a still further variation of the disclosed embodiment, features found to consistently not occur can also be utilized in forming the feature subset masks. Finally, it will be understood that particular features which are observed to virtually never occur during a particular portion of the command word can be utilized to "abort" a sequence.

We claim:

1. Apparatus for recognizing the occurrence of a command word from among input speech that may be of continuous form, comprising:
   means for generating successive subsets of feature signals which depend on the features present in the input speech during successive individual time slots;
   means for sequentially processing the generated subsets of feature signals to determine the time interval of occurrence of a word candidate, said sequential processing means including means for comparing the generated subsets of feature signals with previously stored subsets of features and for determining a time interval during which the comparisons meet a predetermined standard; and
   means for comparing a matrix formed from the feature subset signals which occurred during the determined interval with a previously stored matrix of features that are expected to occur characteristically during the command word, and for generating an occurrence indication when the comparison meets another predetermined standard.

2. Apparatus as defined by claim 1 wherein said sequential processing means is operative to compare a generated subset of features with a particular previously stored subset of features only after prior generated subsets of feature signals have already met predetermined individual comparison standards when they were compared to other previously stored subsets of features.

3. Apparatus as defined by claim 1 wherein said stored subsets of features are determined from feature subset signals found to occur during training utterances of the command word.

4. Apparatus as defined by claim 2 wherein said stored subsets of features are determined from feature subset signals found to occur during training utterances of the command word.

5. Apparatus as defined by claim 3 wherein the stored subsets of features are arranged in a sequential priority order depending upon the order in which they were found to occur during training utterances of the command word.

6. Apparatus as defined by claim 4 wherein the stored subsets of features are arranged in a sequential priority order depending upon the order in which they were found to occur during training utterances of the command word.

7. Apparatus as defined by claim 1 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

8. Apparatus as defined by claim 2 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

9. Apparatus as defined by claim 4 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

10. Apparatus as defined by claim 5 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

11. Apparatus for recognizing the occurrence of a command word from among input speech that may be of continuous form, comprising:

means for storing feature subsets which represent features that are expected to occur characteristically during sequential periods of the command word;

means for storing a matrix of features that are expected to occur characteristically during the command word;

means for generating successive subsets of features signals which depend upon the features present in the input speech during successive individual time slots;

means for sequentially processing the generated subsets of feature signals to determine the time interval of occurrence of a word candidate, said sequential processing means including means for comparing the generated subsets of feature signals with the previously stored subsets of features and for determining a time interval during which the comparisons meet a predetermined standard; and means for comparing a matrix formed from the feature subset signals which occurred during the determined interval with the previously stored matrix of features, and for generating an occurrence indication when the comaprison meets another predetermined standard.

12. Apparatus as defined by claim 11 wherein said sequential processing means is operative to compare a generated subset of features with a particular previously stored subset of features only after prior generated subsets of feature signals have already met predetermined individual comparison standards when they were compared to other previously stored subsets of features.

13. Apparatus as defined by claim 11 wherein said stored subsets of features are determined from feature subset signals found to occur during training utterances of the command word.

14. Apparatus as defined by claim 11 wherein said means for sequentially processing the generated subsets of feature signals includes means for generating a plurality of provisional time intervals, and wherein said means for comparing matrices includes means for performing a matrix comparison of said previously stored matrix as against each of a plurality of matrices formed from the feature subset signals which occurred during each of the provisional time intervals.

15. Apparatus for recognizing the occurrence of a command word from among input speech that may be of continuous form and for generating an occurrence indication which is suitable for control of a companion system, comprising:

means for generating successive subsets of feature signals which depend on the features present in the input speech during successive individual time slots;

means for sequentially processing the generated subsets of feature signals to determine the time interval of occurrence of a word candidate, said sequential processing means including means for comparing the generated subsets of feature signals with previously stored subsets of features and for determining a time interval during which the comparisons meet a predetermined standard; and means for comparing a matrix formed from the feature subset signals which occurred during the determined interval with a previously stored matrix of features that are expected to occur characteristically during the command word, and for generating said occurrence indication when the comparison meets another predetermined standard.

16. Apparatus as defined by claim 15 wherein said sequential processing means is operative to compare a generated subset of features with a particular previously stored subset of features only after prior generated subsets of feature signals have already met predetermined individual comparison standards when they were compared to other previously stored subsets of features.

17. Apparatus as defined by claim 15 wherein said stored subsets of features are determined from feature subset signals found to occur during training utterances of the command word.

18. Apparatus as defined by claim 16 wherein said stored subsets of features are determined from feature subset signals found to occur during training utterances of the command word.

19. Apparatus as defined by claim 17 wherein the stored subsets of features are arranged in a sequential priority order depending upon the order in which they are found to occur during training utterances of the command word.

20. Apparatus as defined by claim 18 wherein the stored subsets of features are arranged in a sequential priority order depending upon the order in which they were found to occur during training utterances of the command word.

21. Apparatus as defined by claim 15 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

22. Apparatus as defined by claim 16 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

23. Apparatus as defined by claim 16 wherein said means for sequentially processing the generated subsets of feature signals includes means for generating a plurality of provisional time intervals, and wherein said means for comparing matrices include means for performing a matrix comparison of said previously stored mateix as against each of a plurality of matrices formed from the feature subset signals which occurred during each of the provisional time intervals.

24. Apparatus as defined by claim 19 wherein said means for sequentially processing the generated subsets of feature signals includes means for generating a plurality of provisional time intervals, and wherein said means for comparing matrices include means for performing a matrix comparison of said previously stored matrix as against each of a plurality of matrices formed from the feature subset signals which occurred during each of the provisional time intervals.

* * * * *

UNITED STATES PATENT AND TRADEMARK OFFICE
CERTIFICATE OF CORRECTION

PATENT NO. : 4,107,460

DATED : August 15, 1978

INVENTOR(S) : Gene Grunza and Marvin B. Herscher

It is certified that error appears in the above-identified patent and that said Letters Patent are hereby corrected as shown below:

col. 5, line 22 change "work" to --word--.

col. 6, line 8 change "store" to --stored--.

col. 9, line 64 change "comman" to --command--.

col. 12, line 52 change "examle" to --example--.

col. 13, line 10 change "37 1"" to --"1"--.

col. 13, line 11 change "$F_{25}$" to --$f_{25}$--.

col. 14, line 58 change "either" to --eight--.

col. 19, line 63 change "comaprison" to --comparison--.

Signed and Sealed this

Sixth Day of March 1979

[SEAL]

Attest:

RUTH C. MASON
*Attesting Officer*

DONALD W. BANNER
*Commissioner of Patents and Trademarks*